Nov. 25, 1924.

F. R. MULNIX ET AL 1,516,888

DISPLAY EASEL

Filed Oct. 2, 1922  2 Sheets-Sheet 1

WITNESSES

Inventor
F. R. MULNIX
F. E. DILLENBECK

By Richard B. Owen, Attorney

Nov. 25, 1924.
F. R. MULNIX ET AL
1,516,888
DISPLAY EASEL
Filed Oct. 2, 1922  2 Sheets-Sheet 2
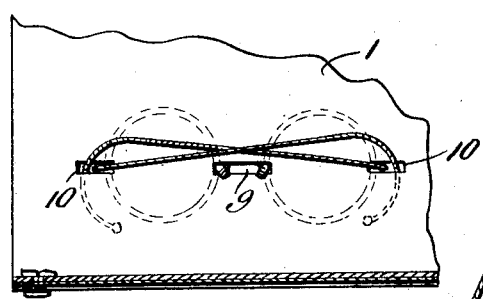
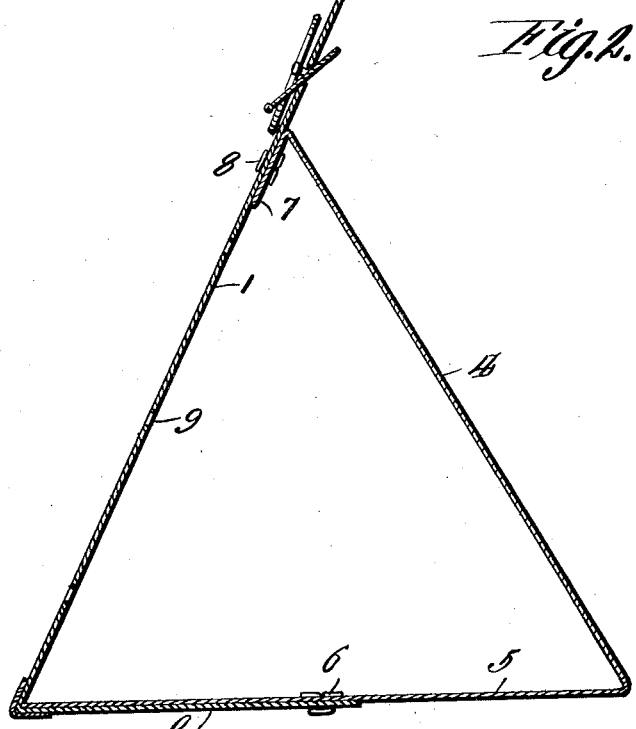
Inventor
F. MULNIX
E. DILLENBECK Patented Nov. 25, 1924.

1,516,888

UNITED STATES PATENT OFFICE.

FRANK R. MULNIX AND FREDERICK E. DILLENBECK, OF ELDORADO, KANSAS.

DISPLAY EASEL.

Application filed October 2, 1922. Serial No. 591,856.

*To all whom it may concern:*

Be it known that we, FRANK R. MULNIX and FREDERICK E. DILLENBECK, citizens of the United States, residing at Eldorado, in the county of Butler and State of Kansas, have invented certain new and useful Improvements in a Display Easel, of which the following is a specification.

This invention relates to a display easel having for its principal object to provide a structure for supporting a plurality of pairs of eye glasses.

Another important object of the invention is to provide an easel constructed so as to support various pairs of glasses of different strengths with legends written adjacent the various pairs so that a customer may wait upon himself.

Another object of the invention is to provide an easel of this nature which will be simple and efficient in construction, reliable in operation and inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made without departing from the scope of what is claimed or the spirit of the invention.

In the drawings:—

Figure 2 is a vertical section therethrough,

Figure 3 is a detail rear elevation of a portion of the easel, and

Figure 4 is a detail transverse section through the easel.

Figure 1:
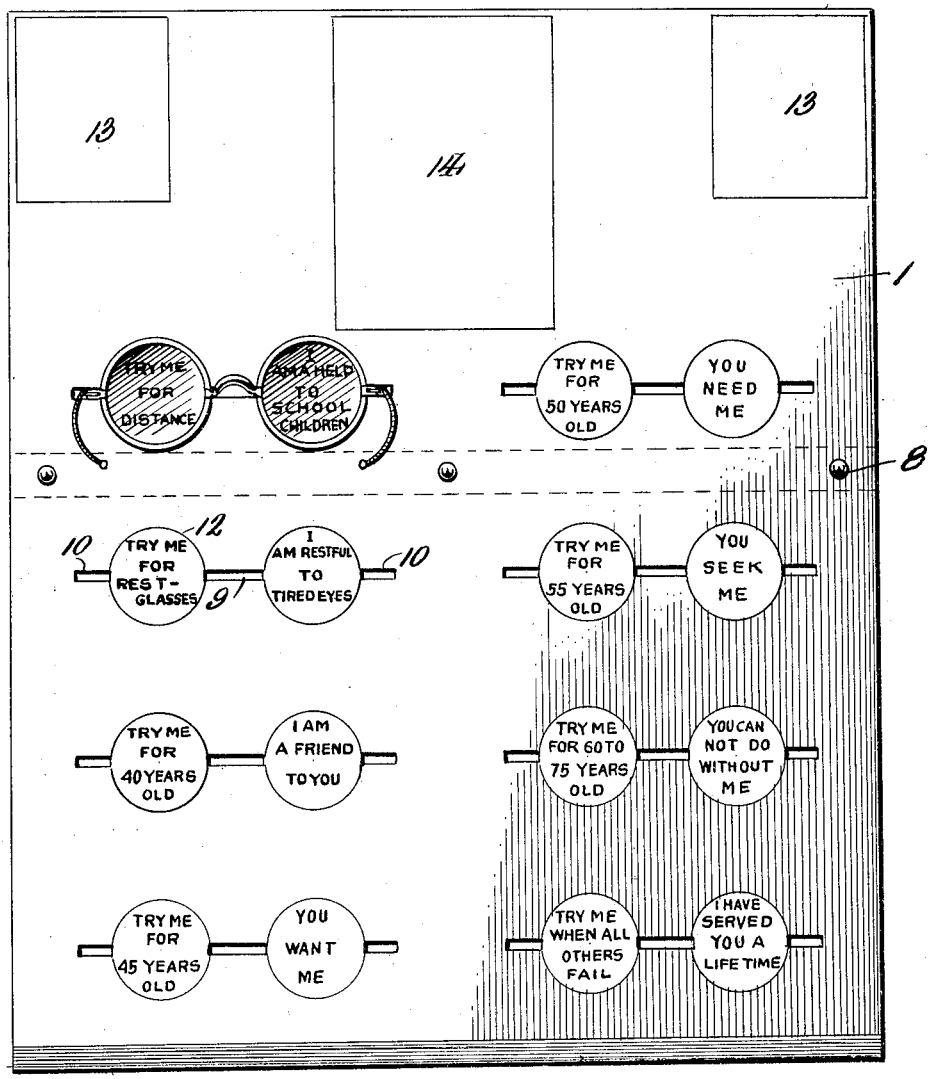
Figure 1 is a front elevation of the easel embodying my invention.

Referring to the drawing in detail it will be seen that the easel consists of a plate 1 having an angular extension 2 at its bottom end. The front plate 1 is adapted to slant, as is shown to advantage in Fig. 2. A top plate 4 is provided with a bottom extension 5 riveted intermediate its ends to the end of the extension 2 as at 6. The upper end of the top plate 4 is provided with the extension 7 which is riveted as at 8 to the front or display plate 1. The plate 1 and the top 4 are made of any suitable material such as cardboard and may be readily assembled being preferably shipped in a flat condition.

The front or display plate 1 is provided with a series of groups of notches there being three notches in each group as is shown to advantage in Fig. 1. The central notch 9 of each group is for receiving the bridge of the eye glasses as is illustrated to advantage in Fig. 4, while the end notches 10 are for receiving the ear pieces of the glasses as is illustrated to advantage in Figs. 1, 3 and 4. Between the notches 9 and 10 there are preferably formed circles 12 having suitable phrases or sentences written therein for the purpose of designating the use to which the particular pair of glasses is used, which is mounted by use of the particular group of slots. At the top of the plate there are preferably disposed advertising panels 13 and 14 of any suitable nature.

Having thus described our invention, what we claim is:—

1. A display easel of the class described comprising a plate having a series of slots therein arranged in spaced relation to and in alinement with each other, and circles marked on the plate between the slots whereby when a pair of glasses are mounted on the plate with their members piercing the slots, the glasses themselves are disposed over the circles so that indicia contained within the circles may be read through the glasses.

2. A display device of the class described comprising a plate having a series of three slots therein arranged in spaced relation to and in alinement with each other, the end slots adapted to receive the ear engaging members of a pair of glasses while the intermediate slot is adapted to receive the bridge piece of a pair of glasses, and circles marked on the plate between the slots so that the lenses proper of a pair of glasses register with the circles in order that indicia which may be arranged on the plate within the circles may be read through the lenses.

In testimony whereof we affix our signatures in presence of two witnesses.

FRANK R. MULNIX.
FREDERICK E. DILLENBECK.

Witnesses:
R. W. EWING,
CHAS. W. HARVEY.